United States Patent [19]

David

[11] 4,185,363
[45] Jan. 29, 1980

[54] HANDLE FOR MANIPULATING LEVER

[75] Inventor: Nicholas F. David, Fullerton, Calif.

[73] Assignee: H. Koch & Sons Division (Gulf & Western Mfg. Co.), Anaheim, Calif.

[21] Appl. No.: 969,374

[22] Filed: Dec. 14, 1978

[51] Int. Cl.² .................. A44G 11/25; B64D 17/30
[52] U.S. Cl. ............................ 24/230 A; 244/151 A
[58] Field of Search .................... 24/230 A, 205.17; 244/151 A, 151 B

[56] References Cited

U.S. PATENT DOCUMENTS

| 3,541,651 | 11/1970 | Gaylord | 24/230 A |
| 3,964,138 | 6/1976 | Gaylord | 24/230 A |

Primary Examiner—Bernard A. Gelak
Attorney, Agent, or Firm—George B. White

[57] ABSTRACT

The releasable strap connector of the type used on parachute harness, has a female connector and a male connector; one or more prongs of the male connector are insertable in fitting pockets in the female connector; a rocking bar has cut-away portions intersecting said pockets so as to interlock with correspondingly cut-away portions of the respective prongs; a manipulating yoke lever is connected to the bar for rocking it into a releasing position where the cut-away portion of the bar is aligned with the pockets and the bar is withdrawn from the cut-away portions of the prongs thereby releasing the male member. The yoke lever has a manipulating handle including a shaft fixedly secured across the outer ends of the legs of the lever having a bore in one end thereof to contain a spring pressed plunger biased outwardly for engagement with a detent in the adjacent flange of the female body; a sleeve is rotatable on the shaft between the legs; the sleeve has a bayonet slot therethrough; a pin extended through the plunger is axially slidable in the axial portion of the bayonet slot and also in an elongated slot in the hollow portion of the shaft whereby the bayonet slot in the sleeve locks the plunger in locking position and prevents it to be withdrawn from the detent, and upon turning the sleeve the cross pin is allowed to move in the longitudinal or axial portion of the bayonet slot so that as the handle is pulled outwardly to rock the yoke lever the rounded tip of the plunger rides out of the detent; the hand turning the sleeve also simultaneously engages a lock lever and moves the same into releasing position allowing the rocking of the yoke lever and the bar into position to release the male member.

10 Claims, 9 Drawing Figures

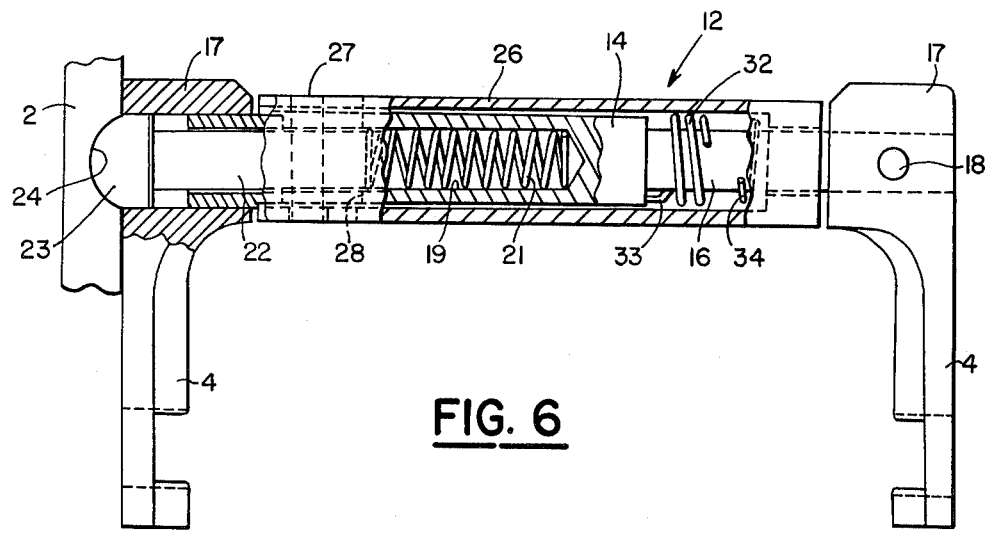
FIG. 6
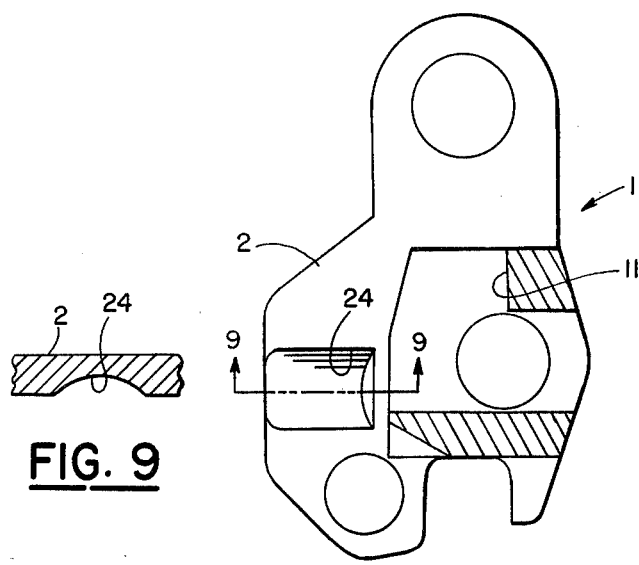
FIG. 9
FIG. 7
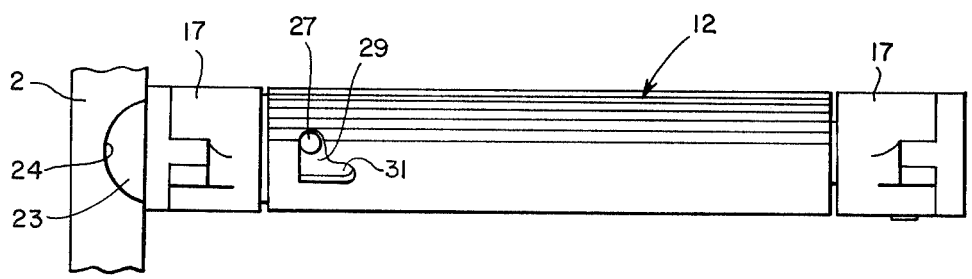
FIG. 8

HANDLE FOR MANIPULATING LEVER

STATE OF THE ART

The general construction of the releasable strap connector of the type on which the herein invention is used, is illustrated in U.S. Pat. No. 3,330,014 granted to John A. Gaylord in 1967, wherein the yoke lever manipulates the rocking bar. The herein invention takes the place of the manipulating handle bar across the legs of the yoke lever of that patent.

In the art of releasable strap connectors utilized in devices wherein positive locking against accidental disengagement yet easy and rapid release in case of emergency are of vital importance, such as in releasable connectors on parachutes, there are continuous attempts to make the interlocking more and more positive, yet the release even more facile.

The primary object of this invention is to provide a manipulating handle which can be rapidly disengaged by easy movement of a hand simply for positioning a handle element to permit a plunger to be pushed out of locking engagement as the handle rocks the locking lever of a releasable strap connector yet be able to positively lock the locking lever. Particularly, it is an object of this invention to provide manipulation in the handle which merely requires the alignment of a slot in an operating sleeve to permit the plunger to move axially against the action of a spring as the sleeve is turned and the handle is pulled along the adjacent flange of the connector body whereby the operation can be performed by holding the sleeve in the turned position while the locking lever is moved to rock the locking bar of the female connector and thereby to provide a superior and facile releasing and locking mechanism for the yoke lever.

BRIEF DESCRIPTION OF THE DRAWINGS

FIG. 6 is a partly sectional view of the manipulating cross handle on the yoke lever.

FIG. 7 is a partly sectional view of the body of the female connector member showing the keeper recess.

FIG. 8 is the top plan view of the handle illustrating the position of the bayonet slot.

FIG. 9 is a cross-sectional view of the flange at the keeper recess, on lines 9—9 of FIG. 7.

DETAILED DESCRIPTION

Figure 1:
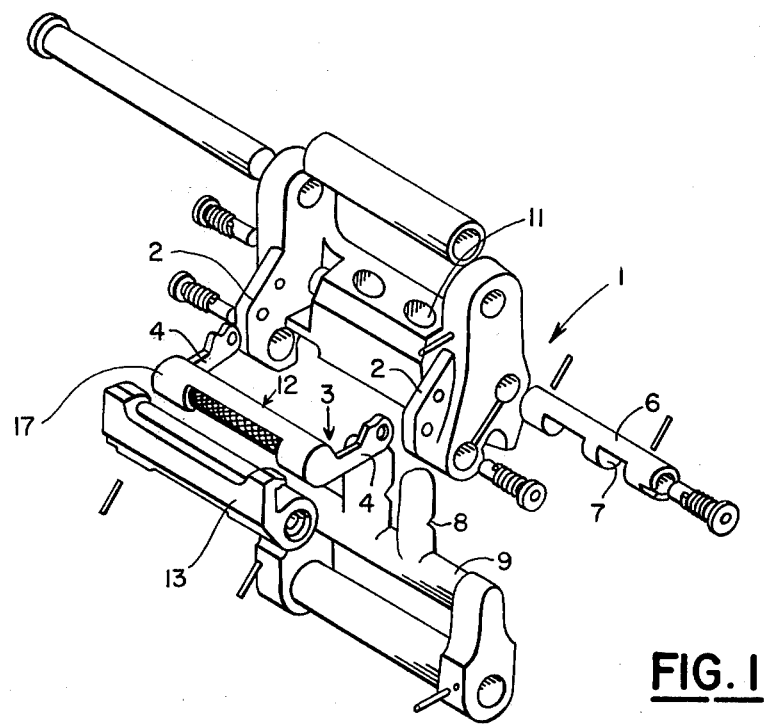
FIG. 1 is a perspective developed view of the parts of the releasable strap connector indicating the location of the manipulating handle on the yoke lever.
Figure 2:
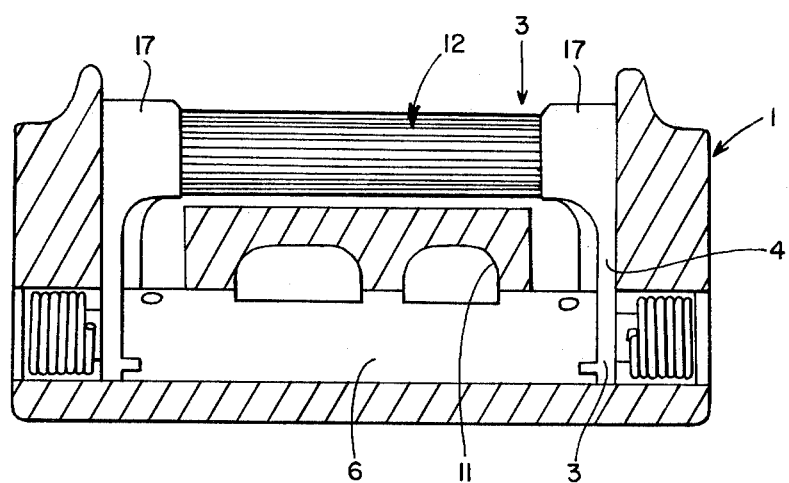
FIG. 2 is a sectional view illustrating the relative location of the yoke lever and the manipulating handle in the female connector member.
Figure 3:
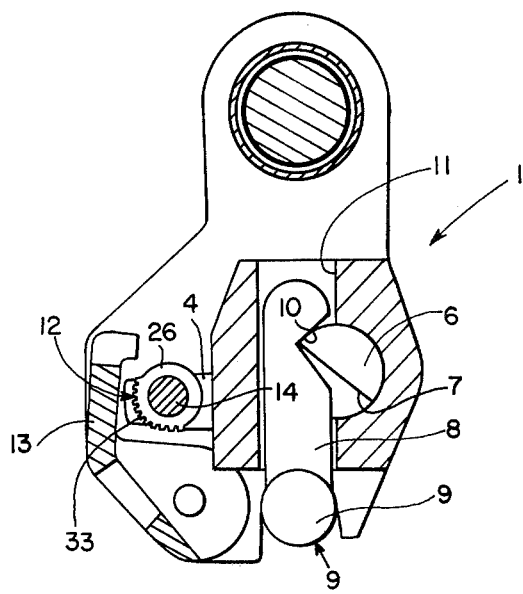
FIG. 3 is a partly sectional view showing the female member of the strap connector in locking position.
Figure 4:
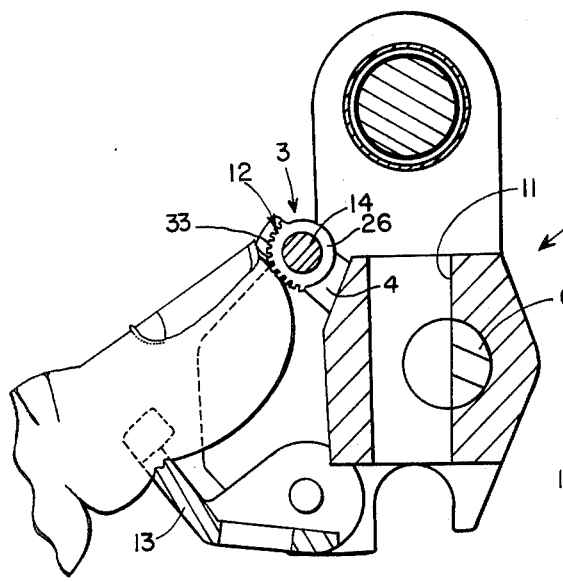
FIG. 4 illustrates the engagement of the thumb of the operator with the locking lever and the engagement with the actuating handle for moving the yoke lever into releasing position.

In the releasable strap connector shown in FIG. 1 the female member 1 has a pair of flanges 2 between which is a yoke lever 3, the legs 4 of which extend along the inside of the flanges 2 and have suitable engagement with a rocking bar 6. Suitable shoulders 7 are formed by cutaway portions in the rocking bar 6 to be engaged by prongs 8 on the male connecting member 9. The rocking bar 6 intersects holes 11 so that the cutaway portions are in registry with the holes 11. The function of the yoke lever 3 is to rock the bar 6 so as to align the cutaway portions of the bar 6 with the sides of the pockets in a nonobstructing position in the holes 11 thereby to allow the withdrawal and insertion of the prongs 8, or to turn the bar 6 so that the portions of the bar adjacent to the cutaway portions project into the holes 11 and engage corresponding recesses 10 in the prongs 8 thereby interlocking the male member 9 in the female member 1 of the strap connector. The outer ends of the yoke lever legs 4 are connected by a handle 12. A locking lever 13 journalled in the female member adjacent said flanges 2 moves between the flanges 2 to engage the handle 12 and lock it either in interlocking or releasing attitude, as shown in FIGS. 3, 4, and 5.

The handle 12 has the device of the herein invention for selectively locking or unlocking the yoke lever 3 respectively in the obstructing or releasing positions of the bar 6.

Figure 5:
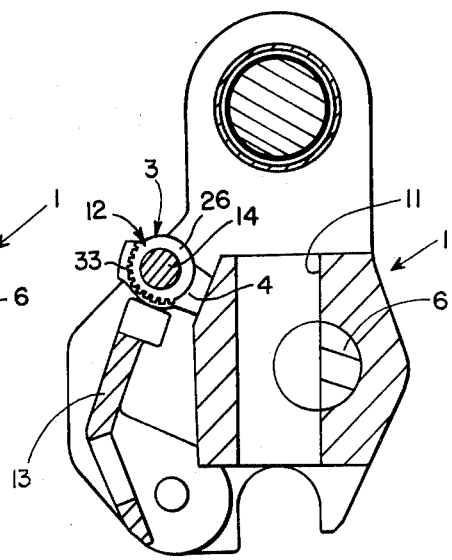
FIG. 5 is a partly sectional view showing the yoke lever in releasing position locked by the locking lever.

The details of the novel manipulating handle 12 are shown in FIGS. 5 and 7. Between the outer ends of the legs 4 of the yoke lever 3 is a shaft 14. One end of the shaft is a reduced diameter shank 16 which is held in the adjacent hub 17 of the leg 4 by a pin 18. The other portion of the shaft 14 is tubular and the bore 19 therein accommodates a coil spring 21 and a plunger 22. A rounded button 23 on the outer end of the plunger 22 is in a pocket 24 in the adjacent flange 2 of the female member 1. The tubular end of the shaft 14 extends into the hub 17 on the free end of the other leg 4.

A sleeve 26 is rotatable on the shaft 14 between the hubs 17 forming the exterior or grip of the handle 12. A cross pin 27 extends through the plunger 22 and is slideable in elongated slots 28 in the shaft 14. At least one bayonet slot 29 in the sleeve 26 engages the cross pin 27 so that one end of the bayonet slot prevents the pin 27 and the plunger 22 to move axially relatively to the shaft 14 until the sleeve 26 is turned so as to register the axial portion 31 of the bayonet slot 29 with the pin 27 and thereby permit the pushing of the plunger 22 against the action of the spring 21 into the bore 19 of the shaft 14 thereby to allow the rocking of the bar 6 by the locking lever 13 into the male releasing attitude.

A torsion spring 32 has one end 33 anchored in the shoulder of the shaft 14 and the other end 34 in the sleeve 26 so that it is biased to urge the sleeve 26 into the initial position shown in FIG. 8 for locking the plunger and the button 23 in engagement with the pocket 24 in the adjacent flange 2 and thereby prevent the turning of the lever 3. The torsion spring 32 is located around the reduced shank 16 of the shaft 14 as shown in FIG. 6.

The operation of this manipulating handle relatively to the remaining interlocking structures is illustrated in FIGS. 3, 4, and 5. In FIG. 3 the sectional portion of the female member 1 shows the shaft 6 projecting into the hole 11 and interlocked with the prong 8 of the male member 9. The yoke lever 3 is shown in this locking position is held in that position in part by the locking lever 13. FIG. 4 shows the thumb engagement by the person pulling the locking lever 13 away from the handle 12 and simultaneously engaging the serrated exterior portion 33 of the sleeve 26 in the position of turning the sleeve 12 to bring the longitudinal or axial portion 31 of the bayonet slot 29 into registry with the pin 27 thereby permitting the pushing of the lever 3 from the position shown in FIG. 3 into the position shown in FIG. 5 at which the locking lever 13, being spring biased toward the lever 3, engages the underside of the sleeve 26. By this time the manipulator had released the sleeve 26 so that the torsion spring 23 returns the sleeve 26 into the initial pin locking position as shown in FIG. 8. To again interlock the male and female connectors the manipulator pulls out the locking lever 13 and allows the lever 3 to move back into the position shown in FIG. 3 in which position the unit is again safely locked in an attitude positively preventing the release of the male member from the female member by shock or accidental striking or other accidental causes.

I claim:

1. A handle for the manipulating lever of a connector member for rocking an interlocking device to selectively release or interlock said connector member with another connector member, comprising a transverse handle support fixed to said lever, a locking member axially resiliently held on said support normally urged into locking engagement with an adjacent part of said connector member thereby resisting movement of said lever relative to said connector member, a manipulatable handle element on said support manually movable relative to said support, releasable coacting means between said manipulatable handle element and said locking member normally restraining the locking member from withdrawing from said interlocking attitude with said connector member, and means to release said coacting means by manual moving of said handle element thereby freeing said locking member from said connecting member and permitting rocking of said lever.

2. The locking handle specified in claim 1, and said locking member being slidable relative to said support toward an adjacent surface of said connector member, and means on said connector member at said adjacent surface engageable by said locking member.

3. The locking handle specified in claim 1, and resilient means on said support engaging said manipulatable handle element for urging said manipulatable handle element into normal position to interlock said releasable coacting means.

4. A locking handle specified in claim 1, and said locking member being a bolt projecting toward the adjacent part of said connector member, and said adjacent part having a detent thereon engageable by said bolt to prevent rocking of said lever.

5. A locking handle specified in claim 1, and said manipulatable handle element being rotatable on said support, and resilient means interconnecting manipulatable handle element with said support so as to initially turn said handle element into locking engagement of said coacting means.

6. The locking handle specified in claim 5, and said coacting means being a slot in said rotatable manipulatable handle element having a substantially axial portion, and a projection on said locking memeber on which said slot rides when said rotatable handle element is rotated to register said axial portion with said projection thereby permitting the forcing of said locking member out of detent.

7. The locking handle specified in claim 6, and said resilient means being biased to turn said handle element so as to move said axial portion of said slot out of registry from said projection thereby to restrain said projection and said locking member.

8. The locking handle specified in claim 1, and said transverse handle support having a cavity at its end adjacent to said adjacent part of said connector member, said locking member being slidable in said cavity axially to said support.

9. The locking handle specified in claim 8, and said manipulatable handle element being rotatable around said support, said releasable coacting means including a projection on said locking member, a slot in said handle element restraining said projection and an axial portion of said slot registerable with said projection by turning said handle element thereby to free said locking member from said restraint.

10. The locking handle specified in claim 9, and resiliently yieldable means between said manipulatable handle element and said support normally to urge said handle element into an attitude wherein said slot is in projection restraining position.

* * * * *